(12) United States Patent
Kato et al.

(10) Patent No.: US 8,213,733 B2
(45) Date of Patent: Jul. 3, 2012

(54) IMAGE PROCESSING APPARATUS, IMAGE PROCESSING METHOD, COMPUTER PROGRAM AND STORAGE MEDIUM

(75) Inventors: Minako Kato, Kawasaki (JP); Kiyoshi Umeda, Kawasaki (JP); Ryosuke Iguchi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 1007 days.

(21) Appl. No.: 12/174,276

(22) Filed: Jul. 16, 2008

(65) Prior Publication Data

US 2009/0034837 A1  Feb. 5, 2009

(30) Foreign Application Priority Data

Jul. 31, 2007 (JP) ................. 2007-199903

(51) Int. Cl.
*G06K 9/00* (2006.01)
*G06K 9/46* (2006.01)
*G06K 9/66* (2006.01)
*G06K 9/40* (2006.01)
*G09G 5/02* (2006.01)
*H04N 5/765* (2006.01)
*G03F 3/08* (2006.01)

(52) U.S. Cl. ........ 382/254; 382/167; 382/190; 382/274; 345/589; 345/590; 345/591; 345/592; 345/593; 345/594; 345/595; 345/596; 345/597; 345/598; 345/599; 345/600; 345/601; 345/602; 345/603; 345/604; 345/605; 348/441; 386/232; 358/518; 358/519; 358/520; 358/521; 358/522; 358/523

(58) Field of Classification Search ............ 382/167, 382/190, 274, 254
See application file for complete search history.

(56) References Cited

U.S. PATENT DOCUMENTS

| | | | | |
|---|---|---|---|---|
| 4,733,295 A * | 3/1988 | Hemsky et al. | ............. | 348/577 |
| 5,130,789 A * | 7/1992 | Dobbs et al. | ............. | 358/500 |
| 5,164,837 A * | 11/1992 | Hirosawa | ............. | 358/296 |
| 5,243,422 A * | 9/1993 | Owashi et al. | ............. | 348/459 |
| 5,566,283 A * | 10/1996 | Modegi et al. | ............. | 345/426 |
| 5,585,860 A * | 12/1996 | Takeshima | ............. | 348/652 |
| 6,724,935 B1 * | 4/2004 | Sawada et al. | ............. | 382/167 |
| 7,050,075 B2 * | 5/2006 | Awamoto et al. | ............. | 345/690 |
| 7,193,746 B2 * | 3/2007 | Kanai | ............. | 358/1.9 |
| 7,194,141 B1 * | 3/2007 | Bao et al. | ............. | 382/254 |
| 8,040,413 B2 * | 10/2011 | Egawa et al. | ............. | 348/278 |
| 8,135,235 B2 * | 3/2012 | Kang et al. | ............. | 382/276 |
| 2002/0101542 A1 * | 8/2002 | Into | ............. | 348/591 |
| 2003/0090690 A1 * | 5/2003 | Katayama et al. | ............. | 358/1.9 |
| 2003/0098983 A1 * | 5/2003 | Terada | ............. | 358/1.2 |
| 2004/0189818 A1 * | 9/2004 | Tsuruoka et al. | ............. | 348/221.1 |
| 2005/0174590 A1 * | 8/2005 | Kubo | ............. | 358/1.9 |
| 2006/0012606 A1 * | 1/2006 | Hiraki et al. | ............. | 345/590 |
| 2006/0012839 A1 * | 1/2006 | Fukuda | ............. | 358/518 |
| 2007/0132858 A1 * | 6/2007 | Chiba et al. | ............. | 348/222.1 |
| 2007/0273908 A1 * | 11/2007 | Hoshii | ............. | 358/1.9 |
| 2008/0309777 A1 * | 12/2008 | Aoyama | ............. | 348/222.1 |
| 2009/0091643 A1 * | 4/2009 | Aragaki | ............. | 348/254 |

FOREIGN PATENT DOCUMENTS

JP  2007-018073  1/2007

* cited by examiner

*Primary Examiner* — Michelle Entezari
(74) *Attorney, Agent, or Firm* — Cowan, Liebowitz & Latman, P.C.

(57) ABSTRACT

An image processing method is a method for correcting both an image quality of an overall image and an image quality of a partial image with excellent balance.

15 Claims, 8 Drawing Sheets

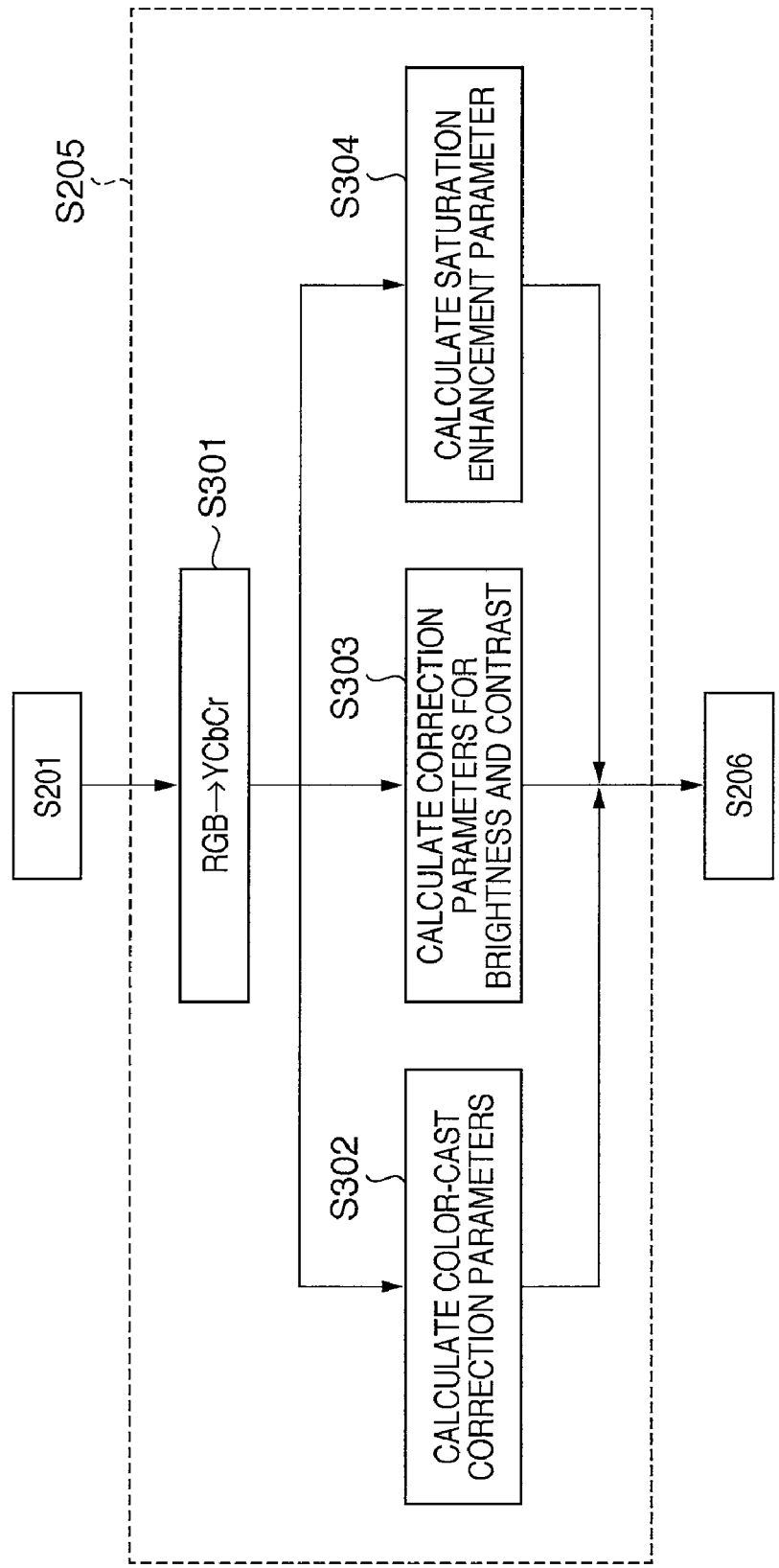

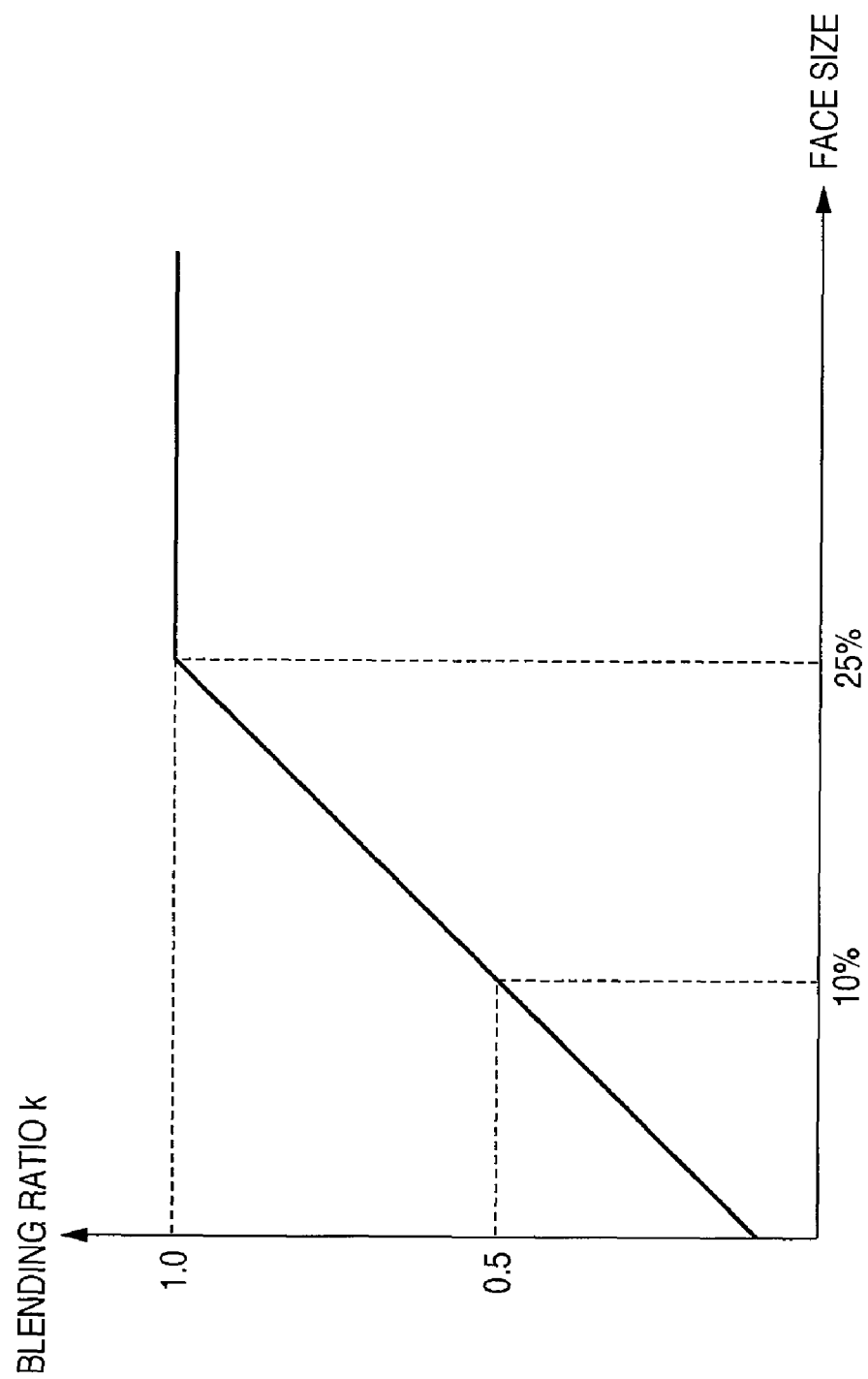

IMAGE PROCESSING APPARATUS, IMAGE PROCESSING METHOD, COMPUTER PROGRAM AND STORAGE MEDIUM

BACKGROUND OF THE INVENTION

1. Field of the Invention

The present invention relates to an image processing technique for raising the image quality of a digital image by applying a correction.

2. Description of the Related Art

Techniques for analyzing a digital image obtained by a digital camera or scanner, etc., and applying a correction so as to obtain an excellent image quality have been proposed. For example, many pixels in an image are distributed over dark gradations in case of underexposure, and many pixels in an image are distributed over bright gradations in case of overexposure. In a correction of inappropriate brightness thus ascribable to underexposure or overexposure, there is a technique that involves analyzing a histogram of pixels in the image and correcting brightness so as to obtain an appropriate histogram.

A technique proposed in recent years involves determining a feature in a digital image, detecting a digital image of a specific object (e.g., a person's face) and applying a specialized correction to the object.

Japanese Patent Application Laid-Open No. 2007-18073 discloses an image processing technique that includes: determining density correction coefficients obtained by analyzing an overall digital image that has been input and density correction coefficients obtained by analyzing the area of a person's face; comparing both coefficients to evaluate the degree of compatibility thereof and revising the density correction coefficients of the local area in accordance with the degree of compatibility; and executing correction processing upon blending the revised density correction coefficients of the local area and the density correction coefficients of the overall digital image at a prescribed blending ratio.

The conventional correction of a digital image is such that both overall-image correction parameters for optimizing the overall image and local-image correction parameters for optimizing a local face area are used in the same correction processing, namely a density (or brightness) correction. The parameters used when correction processing is executed also have the same parameter format, namely that of a one-dimensional look-up table (1D-LUT), with respect to the γ coefficient and brightness. As a result, the blending of overall-image correction parameters and local-image correction parameters can be performed by simple addition (superposition).

However, correction processing has become more complex and multifarious with the aim of achieving a further improvement in the image quality of digital images, and besides the conventional correction of brightness only, correction of color cast due to loss of color balance has become important.

In addition to techniques for dealing with so-called "failed" images, such as images with exposure errors or poor white balance, techniques for correcting flesh color or the color of the sky or greenery to obtain a more desirable color and techniques for correcting an image so as to appear sharper are also important.

It is necessary to select, depending upon the nature of correction processing, an algorithm that is the most efficacious and involves little computational load. However, the formats of the optimum parameters for this purpose differ depending on the nature of the correction processing and algorithm.

For example, although a one-dimensional look-up table (1D-LUT) for dealing with brightness is the most effective method in order to correct brightness, correcting the overall image using a 3×3 rotation matrix is the most effective method for correcting color cast. Furthermore, often an across-the-board constant is used in order to improve the saturation (chroma) of the overall image. If a plurality of correction processes are executed, parameters having a format conforming to each correction process become necessary, but parameters having different formats can be simply added.

By using correction parameters relating to one correction process at a time, it is possible to blend, at a prescribed ratio, an image corrected by a correction value for optimizing an overall digital image and an image corrected by a correction value for optimizing a face area.

However, in order to execute a plurality of correction processes with such method, a large-capacity memory for holding the original image and the image after correction is required. This means that an increase in cost is unavoidable.

SUMMARY OF THE INVENTION

The present invention has been devised in view of the foregoing problems and seeks to provide an image processing technique that makes it possible to execute correction processes suited to both an overall image and object without raising cost.

According to one aspect of the present invention, there is provided an image processing apparatus comprising: an extracting unit adapted to extract a partial image corresponding to an object designated beforehand from an entered image; a first calculating unit adapted to calculate correction parameters with regard to respective ones of a plurality of types of correction processes for correcting the image quality of the partial image; a first generating unit adapted to generate first conversion parameters for correcting the partial image, the first correction parameters reflecting respective ones of the correction parameters calculated by the first calculating unit; a second calculating unit adapted to calculate correction parameters with regard to respective ones of a plurality of types of correction processes for correcting the image quality of the entered overall image; a second generating unit adapted to generate second conversion parameters having a format common with that of the first conversion parameters for correcting the overall image, the second correction parameters reflecting respective ones of the correction parameters calculated by the second calculating unit; and a blending unit adapted to add the first conversion parameters and the second conversion parameters in accordance with a predetermined ratio, thereby generating image correction parameters for correcting the entered image.

According to another aspect of the present invention, there is provided an image processing method comprising: an extracting step of extracting a partial image corresponding to an object designated beforehand from an entered image; a first calculating step of calculating correction parameters with regard to respective ones of a plurality of types of correction processes for correcting the image quality of the partial image; a first generating step of generating first conversion parameters for correcting the partial image, the first correction parameters reflecting respective ones of the correction parameters calculated at the first calculating step; a second calculating step of calculating correction parameters with regard to respective ones of a plurality of types of correction processes for correcting the image quality of the entered overall image; a second generating step of generating second conversion parameters having a format common with that of the first conversion parameters for correcting the overall image, the second correction parameters reflecting respective ones of the correction parameters calculated at the second calculating step; and a blending step of adding the first conversion parameters and the second conversion parameters in accordance with a predetermined ratio, thereby generating image correction parameters for correcting the entered image.

In accordance with the present invention, it is possible to execute correction processes suited to both an overall image and object without raising cost.

Further features of the present invention will become apparent from the following description of exemplary embodiments with reference to the attached drawings.

BRIEF DESCRIPTION OF THE DRAWINGS

FIG. 3 is a flowchart useful in describing the flow of processing for calculating correction parameters of a plurality of types for correcting the image quality of an overall image;

FIG. 8 is a diagram for illustratively describing the relationship between face size and blending ratio.

DESCRIPTION OF THE EMBODIMENTS

Preferred embodiments of the present invention will be described illustratively and in detail below with reference to the drawings. It should be noted that the structural elements in these embodiments are for illustrative purposes only and that the technical scope of the present invention is determined by the scope of the claims and is not limited by the individual embodiments set forth below.

Figure 1:
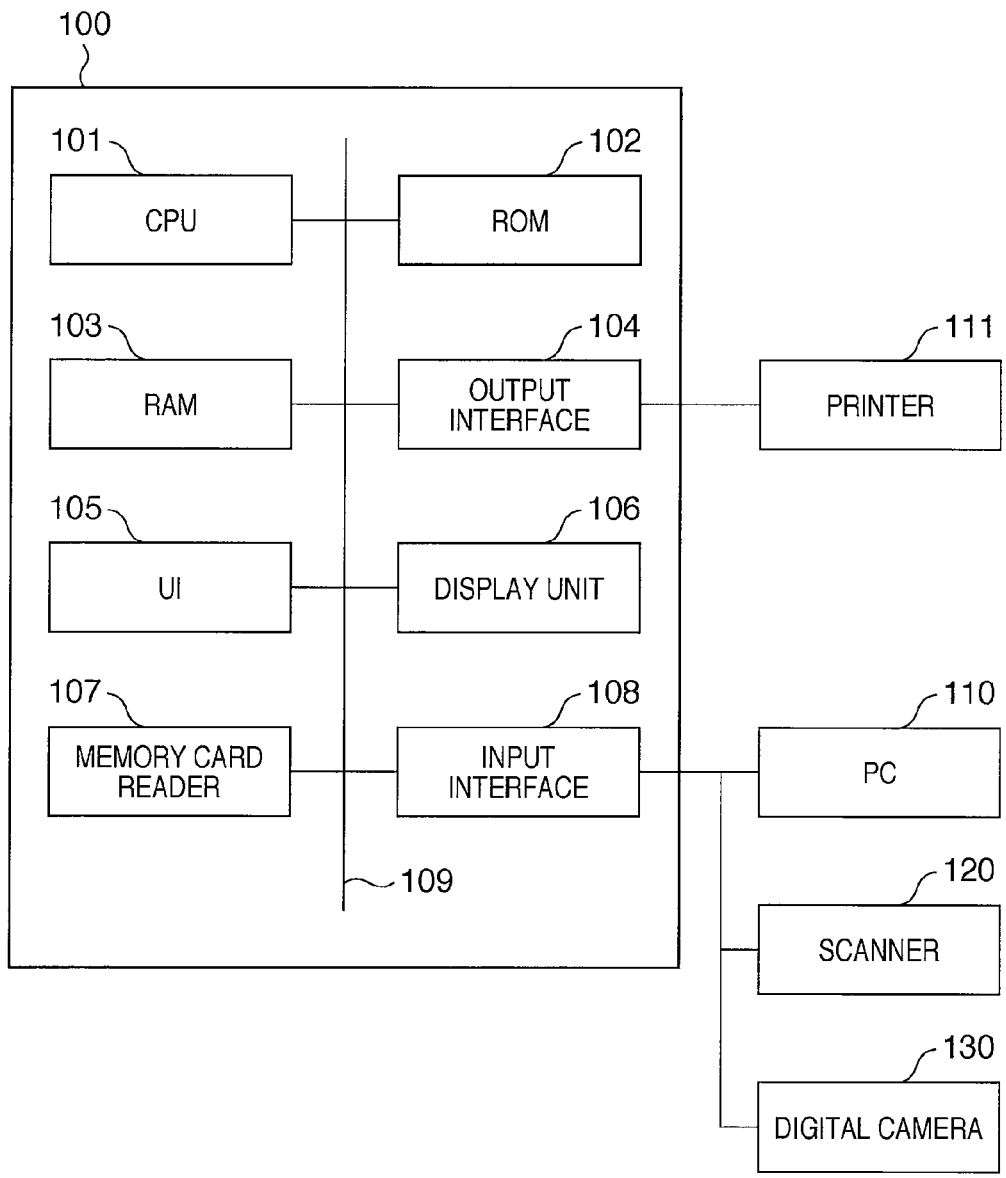
FIG. 1 is a diagram exemplifying the hardware configuration of an image processing apparatus according to an embodiment of the present invention.

FIG. 1 is a diagram exemplifying the hardware configuration of an image processing apparatus 100 capable of executing processing according to the present invention. A CPU 101 calculates correction parameters corresponding to correction processes of a plurality of types for correcting the image quality of a digital image and generates image data that reflects the correction of image quality. The plurality of correction processes for correcting the image quality of a digital image include a correction of color cast (a hue correction), a correction of brightness and contrast (a luminance correction) and a correction of saturation. A program for calculating correction parameters corresponding to correction processes, a program for converting correction parameters, an image processing program and a data table corresponding to correction processing, etc., have been stored in a ROM 102. A RAM 103 is capable of functioning as a work area of the CPU 101. The RAM 103 is also capable of functioning as storage means for storing an entered digital image temporarily. In a preferred arrangement, the image processing apparatus 100 has an output interface 104 and a user interface 105 such as a keyboard and touch-sensitive panel. The image processing apparatus 100 further includes a display unit 106 such as a liquid crystal display, a memory card reader 107 and an input interface 108 corresponding to a USB or the like. These structural elements are connected to a system bus 109.

The image processing apparatus 100 is capable of being connected to a printer 111, which serves as an output unit, via the output interface 104. Results of correcting a digital image can be output from the image processing apparatus 100 to the printer 111. Accordingly, the output interface 104 is capable of functioning as output means for outputting the results of correcting a digital image.

The input interface 108 is capable of being connected to an information processing apparatus (personal computer) 110, a scanner 120 and a digital camera 130 via a USB cable, by way of example. It should be noted that means for making the connection to the information processing apparatus (personal computer) 110, etc. is not limited to a USB cable. For example, the connection to the information processing apparatus (personal computer) 110, etc., can be performed via a wired or wireless network. In this case the input interface 108 is capable of functioning as receiving means for receiving a digital input that enters from the information processing apparatus (personal computer) 110, scanner 120 and digital camera 130.

FIG. 1 illustrates an arrangement in which the image processing apparatus 100 is connected to the information processing apparatus (personal computer) 110 and printer 111, etc. However, the gist of the present invention is not limited to this example. For instance, an arrangement may be adopted in which the image processing according to the embodiment of the present invention is executed by incorporating the image processing apparatus within the printer 111, digital camera 130 or within a device such as a copier, facsimile machine or television.

Figure 2:
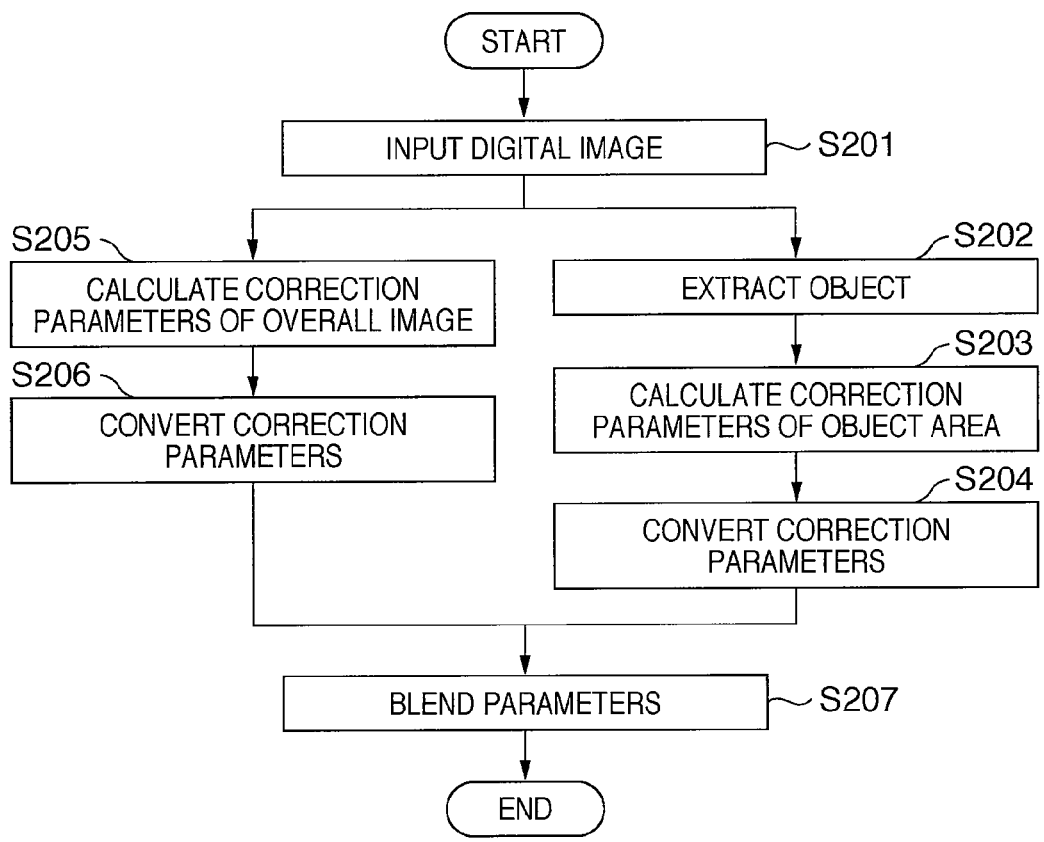
FIG. 2 is a flowchart for describing the flow of processing relating to the generation of image correction parameters according to an embodiment of the present invention.

FIG. 2 is a flowchart for describing the flow of processing relating to the generation of image correction parameters according to an embodiment of the present invention. This processing is executed under the overall control of the CPU 101.

First, in S201, a digital image that is an original image is input to the image processing apparatus 100. When the input interface 108 receives the digital image, the digital image, under the control of the CPU 101, is stored in the RAM 103 as an original digital image that is the source of correction processing.

The CPU 101 executes processing (S202 to S204) relating to a local area, which corresponds to an object designated in advance, processing (S205, S206) relating to the overall digital image, and processing (S207) relating to blending of the relevant parameters.

In S202, the CPU 101 extracts a partial image corresponding to the previously designated object from the entered image. By executing various analyses such as threshold processing, labeling processing and edge detection, etc., the CPU 101 extracts the partial image corresponding to the target object from the entered digital image. An example in which the face of a person is adopted as the object will be described in this embodiment. It should be noted that examples of objects are not limited to the face of a person. For example, if an element constitutes a digital image such as a background image of the sea or a mountain, an animal or a building, etc., then this element can be designated beforehand as an object via the user interface 105.

In relation to the partial image of the extracted object, the CPU 101 generates, as object extraction information, information for identifying the type of object and information relating to the position of the extracted object with respect to the entirety of the digital image. The object extraction information is stored in the RAM 103 under the control of the CPU 101. In a determination relating to a blending ratio k, described later, the CPU 101 is capable of determining sizes and number of extracted objects based upon the object extraction information.

In step S203, based upon the entered digital image (original digital image) and object extraction information, the CPU 101 calculates correction parameters for executing corrections of a plurality of types, described later. In this case, the CPU 101 functions as first calculating means for calculating each of the correction parameters regarding a plurality of types of correction processes for correcting the image quality of the partial image. In a case where the object extracted in S202 is the face of a person, the CPU 101 calculates correction parameters for executing correction processing that affords the face with the desirable image quality. The various correction parameters calculated here become data having a format that differs from a three-dimensional look-up table (3D-LUT). Calculation of the correction parameters will be described in detail later with reference to FIG. 6.

In S204, the CPU 101 generates image correction parameters corresponding to correction of the object area that reflects the various correction parameters calculated in S203. The result is data having the format of a three-dimensional look-up table (3D-LUT). In this case, the CPU 101 functions as first generating means that generates first conversion parameters for correcting the partial image reflecting each of the correction parameters calculated in S203.

Meanwhile, in S205, the CPU 101 calculates correction parameters for applying various correction processes, described later, to the entirety of the digital image entered in S201. Here the CPU 101 functions as second calculating means for calculating each of the correction parameters with regard to a plurality of types of correction processes for correcting the image quality of the overall entered image. The various types of correction parameters calculated become data having a format different from a three-dimensional look-up table (3D-LUT). This processing will be described in detail later with reference to FIG. 3.

Next, in S206, the CPU 101 generates image correction parameters corresponding to the correction of the overall image reflecting the various correction parameters calculated in S205. The result is data having the format of a three-dimensional look-up table (3D-LUT). In this case, the CPU 101 functions as second generating means that generates second conversion parameters, which have a format shared in common with that of the first conversion parameters, for correcting the overall image, these second conversion parameters reflecting the correction parameters calculated in S205. This processing will be described in detail later with reference to FIG. 7.

In S207, the CPU 101 generates image correction parameters obtained by blending (adding) the first and second conversion parameters that have been converted to the format of a three-dimensional look-up table in S204 and S206. Since the first and second conversion parameters obtained by the conversions in S204 and S206 have the same format (3D-LUT), the CPU 101 is capable of executing numerical computation in which the elements are added at a prescribed ratio.

[Calculation of Correction Parameters of Overall Image (S205)]

FIG. 3 is a flowchart useful in describing the flow of processing for calculating correction parameters of a plurality of types for correcting the image quality of an overall image in S205 in FIG. 2. This processing is executed under the control of the CPU 101.

The correction processes include a correction of hue (correction of color cast), a correction of brightness and contrast (a luminance correction) and a correction of saturation. The color-cast correction parameters, brightness and contrast correction parameters and saturation enhancement parameters calculated by this process have formats (data formats) that differ from one another.

In S301, the CPU 101 converts an RGB image signal of the entered digital image to luminance Y, which is a component relating to image brightness, and to color difference signals Cb, Cr, which are components relating to color.

Figure 4B:
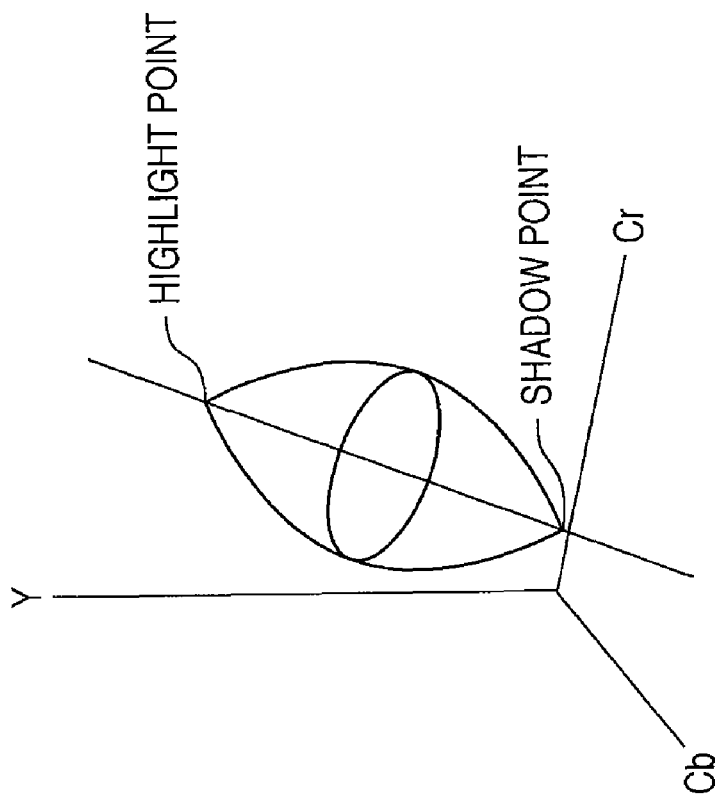
FIGS. 4A and 4B are diagrams useful in describing a color cast correction.
Figure 4A:
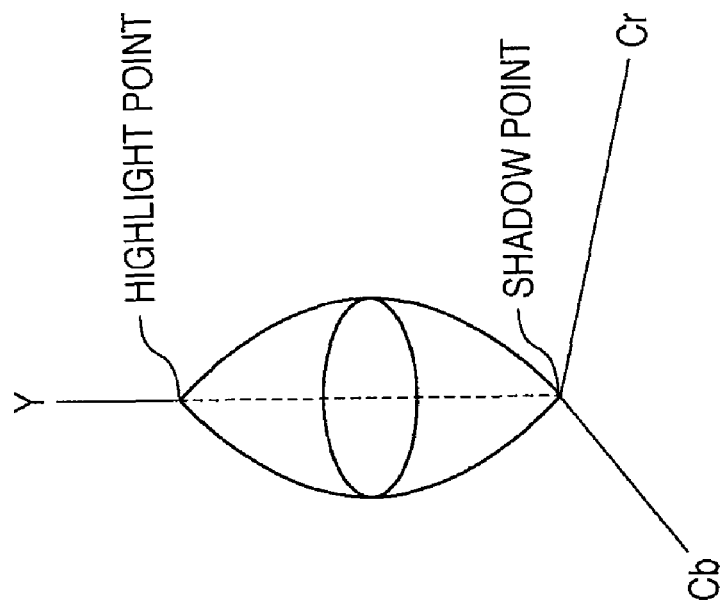

In S302, the CPU 101 calculates correction parameters (color-cast correction parameters) having a 3×3 matrix format, which is a rotation matrix for correcting color cast. Here the calculation of color-cast correction parameters can be performed by a method of the kind now described with reference to FIGS. 4A, 4B. If the input image has a color cast, a line connecting a bright point (highlight point) and a dark point (shadow point) of a color solid comprising a distribution of YCbCr of pixels in the color space of luminance Y and color difference signals Cb, Cr will be tilted from the axis of luminance Y (see FIG. 4B). Color cast can be corrected by converting this color solid, which represents the original digital image, in such a manner that the line connecting the highlight point and shadow point will coincide with the luminance Y axis, as illustrated in FIG. 4A. Conversion of the color solid can be achieved by rotating the color solid to correct for the tilt and then performing a translation to correct for deviation in the CrCb plane of the color difference signals. The CPU 101 calculates a rotation matrix, which executes such conversion processing, as parameters for correcting color cast. As a method of performing the color conversion, the method using the rotation matrix is simple and is an effective method in that overall tonality can be maintained by preserving linearity.

It should be noted that the above-mentioned method of calculating parameters for color-cast correction is illustrative. For example, color-cast correction parameters may be calculated solely from the highlight point, and color-cast correction parameters can be calculated using a point of interest of a halftone.

Figure 5A:
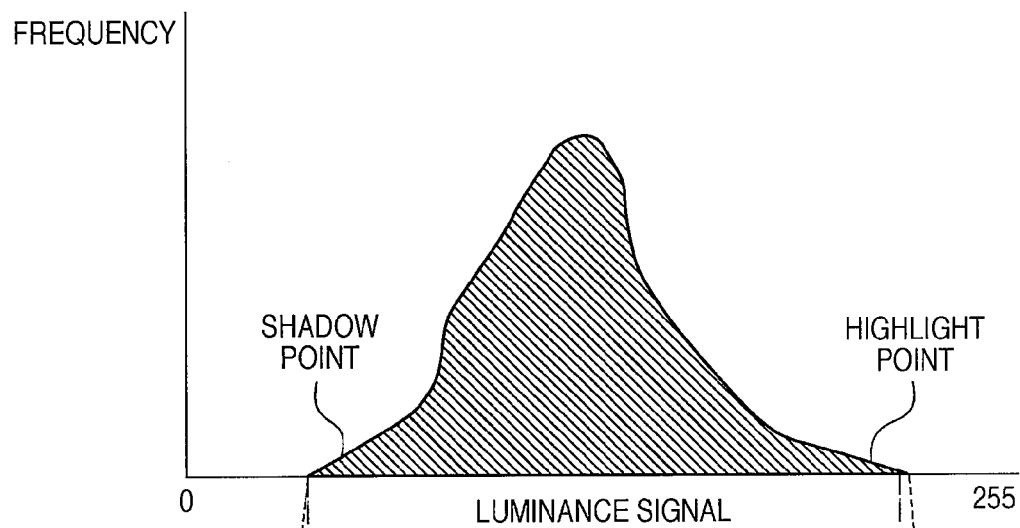
FIGS. 5A and 5B are diagrams useful in describing a correction of brightness and contrast.
Figure 5B:
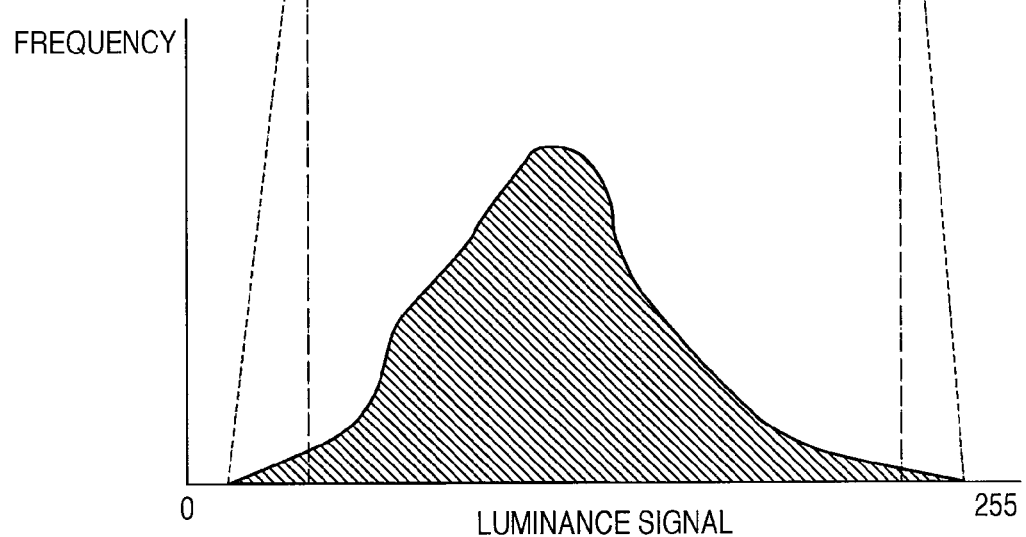

In S303, the CPU 101 calculates correction parameters having the format of a one-dimensional look-up table (1D-LUT) in order to correct luminance (brightness or contrast). Here the calculation of brightness and contrast correction parameters can be performed by a method of the kind now described with reference to FIGS. 5A, 5B. First, the CPU 101 creates a histogram by an accumulated number of pixels of a luminance signal. In a case where brightness is not appropriate, the histogram develops an offset to one side, as illustrated in FIG. 5A. To correct brightness or contrast, the CPU 101 corrects the luminance of the shadow point to "0" or to a value (e.g., "10") near "0". Further, the CPU 101 corrects the luminance of the highlight point to "255" or to a value (e.g., "245") near "255". By enlarging the luminance distribution range, the image can be corrected to one having an appropriate brightness such that the image is distributed over the full luminance (signal) range, as depicted in FIG. 5B.

Since the correction in S303 is a correction solely of luminance for the purpose of correcting brightness and contrast, a luminance-related 1D-LUT such as a gradation curve, for example, is suitable as the parameter format. The CPU 101 is capable of extracting the highlight point and shadow point from the entered digital image and calculating correction parameters for brightness and contrast in such a manner that the luminance value of these points are converted to prescribed values. As a method of performing the color conversion, the method using the 1D-LUT is simple and is an effective method in that there is a high degree of freedom.

It should be noted that the above-mentioned method of calculating parameters for brightness does not impose any limitation; the brightness of halftones may be subjected to a conversion, and a conversion that enhances contrast further may be performed.

In S304, the CPU 101 calculates an enhancement coefficient (saturation enhancement parameter) for enhancing saturation. The calculation of the saturation enhancement parameter can be calculated as follows: If saturation is expressed using color difference signals, then it will correspond to distance from the luminance axis of each of the color difference signals ($S^2 = Cb^2 + Cr^2$, where S represents saturation). Accordingly, if saturation is increased 20% across the board, for example, then calculation of the parameter is attained by multiplying each of the color differences Cb and Cr by 1.20 (here 1.20 is a saturation enhancement coefficient). In other words, the saturation enhancement parameter can be calculated by adopting a constant multiple of Cb, Cr. The saturation enhancement parameter can be determined from the distribution of colors in the image. Furthermore, it is also possible to determine the parameter from shooting information that has been appended to the image.

[Calculation of Object-Area Correction Parameters (S203)]

Figure 6:
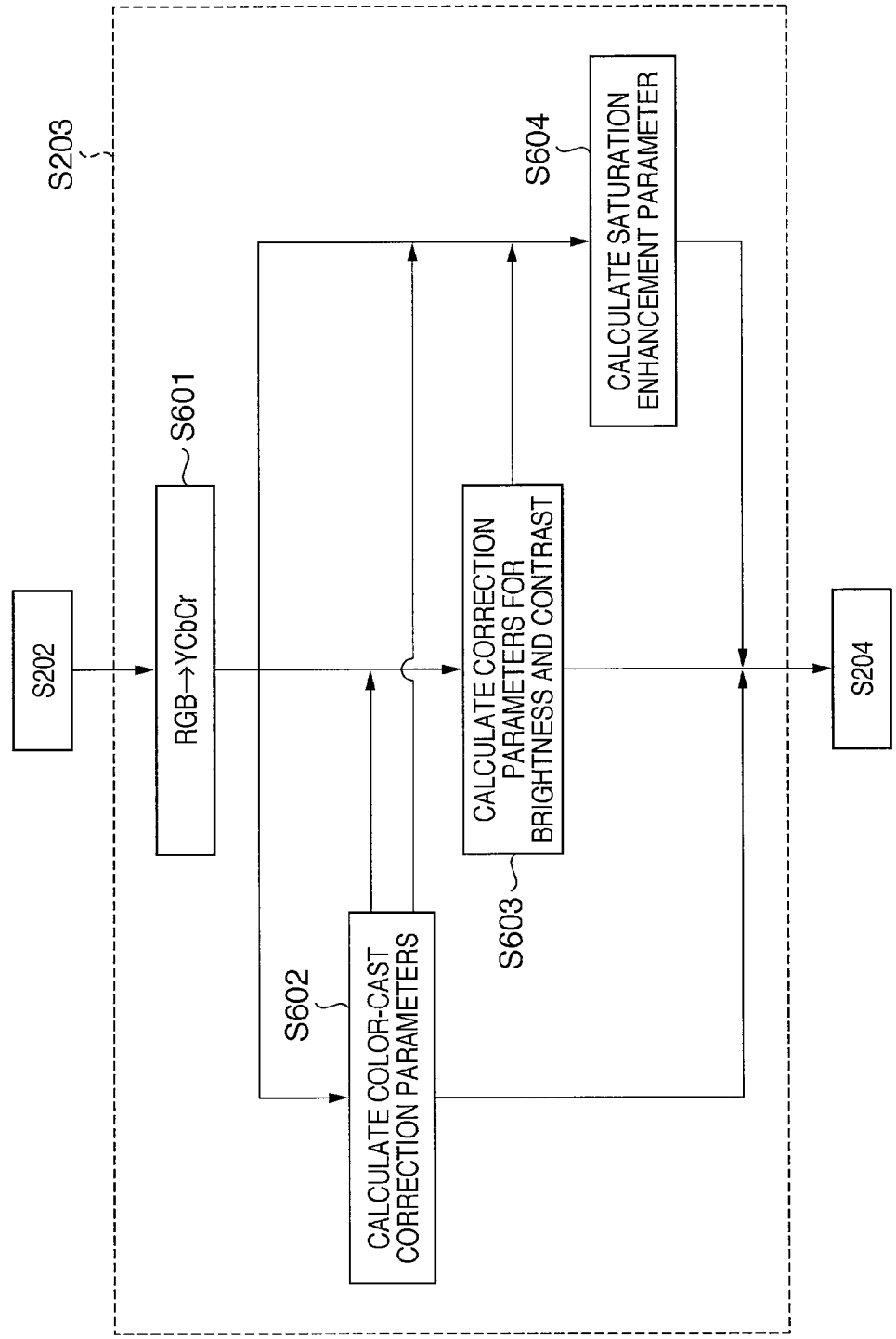
FIG. 6 is a flowchart useful in describing the flow of processing for calculating correction parameters of a plurality of types for correcting the image quality of a partial image corresponding to an object area.

FIG. 6 is a flowchart useful in describing the flow of processing for calculating correction parameters of a plurality of types for correcting the image quality of a partial image corresponding to an object area in S203 in FIG. 2. This processing is executed under the control of the CPU 101. Here a case where the face of a person has been designated as an object will be described as an example.

In S601, the CPU 101 converts an RGB image signal of the partial image, which corresponds to the object extracted by the processing of S202, to luminance Y, which is a component relating to image brightness, and to color difference signals Cb, Cr, which are components relating to color.

In relation to the partial image corresponding to the object area, the CPU 101 creates a luminance histogram in a manner similar to FIGS. 5A, 5B and obtains an average luminance value ($Y_{av}$). The CPU 101 then calculates average color values ($Cb_{av}$, $Cr_{av}$) of the color difference signals corresponding to the average luminance value ($Y_{av}$). This calculated average value is adopted as a face-area average value ($Y_{av}$, $Cb_{av}$, $Cr_{av}$).

On the other hand, under the control of the CPU 101, target values of luminance Y and color difference components (Cb, Cr) are set beforehand in relation to the partial image corresponding to the object area. These constitute an average flesh color desirable in order to express the face of a person and are target values for when the average value (face-area average value) of the object area is corrected. The target values of luminance and color difference components of the partial image corresponding to the face of the person are ($Y_{target}$, $Cb_{target}$, $Cr_{target}$).

The CPU 101 is capable of calculating and setting a statistically desirable flesh color as the target values ($Y_{target}$, $Cb_{target}$, $Cr_{target}$) from a plurality of images. Furthermore, the CPU 101 is also capable of using a value that has been set in the ROM 102 in advance. In addition, the CPU 101 is also capable of setting a target value variably in accordance with the face-area average value. For example, if the average luminance value ($Y_{av}$) is below a threshold value, the target luminance value ($Y_{target}$) will also be lowered correspondingly. As a result, a large-scale parameter correction is executed and it is possible to prevent an imbalance in overall image quality.

In S602, the CPU 101 calculates correction parameters (color-cast correction parameters) for correcting the color cast of the extracted object. The correction parameters (color-cast correction parameters) constitute 3×3 matrix-format data, which is a rotation matrix. The CPU 101 calculates a rotation matrix that makes it possible to execute a conversion such that a line connecting highlight and shadow points will coincide with the luminance Y axis in the manner described above with reference to FIGS. 4A, 4b.

Next, the CPU 101 multiplies the calculated rotation matrix by the face-area average value ($Y_{av}$, $Cb_{av}$, $Cr_{av}$) to thereby calculate a mapping point ($Y_{av'}$, $Cb_{av'}$, $Cr_{av'}$) of the face-area average value. In a case where a problem arises in expressing the flesh color, such as when the mapping point is mapped in the green direction relative to the original color or when mapping is performed to a mapping point that is far from the target value, the CPU 101 adjusts the parameters of the rotation matrix, such as by weakening the rotation angle. Thus, color-cast correction parameters that take flesh color into consideration are calculated with respect to the extracted object.

Next, the CPU 101 calculates luminance correction parameters (parameters for correction of brightness and contrast) and a saturation enhancement parameter. The processing for calculating luminance correction parameters and saturation enhancement parameter is processing for obtaining correction parameters that convert the face-area average value converted by the color-cast correction to a face-area target value for expressing a desired flesh color in relation to luminance and saturation.

In S603, the CPU 101 calculates correction parameters for correcting luminance. The CPU 101 calculates correction parameters such that the color-cast corrected average value $Y_{av'}$ of luminance calculated in S602 will coincide with the luminance target value $Y_{target}$ set in S601. The correction parameters calculated here have the format of a one-dimensional look-up table (1D-LUT). The CPU 101 is capable of calculating a luminance-related 1D-LUT such as a gradation curve, for example, as the correction parameters. It is also possible for the CPU 101 to calculate a γ value of a gamma conversion from the average value $Y_{av'}$ of color-cast corrected luminance and luminance target value $Y_{target}$.

In S604, the CPU 101 calculates an enhancement coefficient (saturation enhancement parameter) for enhancing saturation. Here the enhancement coefficient is a parameter that causes the color-cast corrected color difference components $Cb_{av'}$, $Cr_{av'}$ calculated in S602 to coincide with the face-area target values ($Cb_{target}$, $Cr_{target}$) relating to color difference components set in S601.

There are instances where a particularly bright area of an image is degraded when a correction for enhancing saturation is applied to the entirety of a partial image corresponding to an extracted object. For example, there are examples where white clouds take on a flesh-color color. Therefore, by setting a revision coefficient that varies the calculation of the saturation enhancement parameter in accordance with the result of luminance correction (luminance correction parameters) (S603), such degradation of the image (particularly degradation of bright areas in the image) can be prevented.

It is also possible to set a revision coefficient that varies the saturation enhancement parameter, which has been calculated based upon the face average color difference values ($Cb_{av}$, $Cr_{av}$) and face-area target values ($Cb_{target}$, $Cr_{target}$), in accordance with the result of luminance correction (luminance correction parameters). For example, the revision coefficient is made "1" in the case of the $Y_{target}$ luminance and is made smaller than "1" in the case of a highlight area. The setting is such that revision coefficient=0 holds in the case of the maximum luminance value (Y=255). This makes it possible to reduce degradation of a highlight area due to an excessive revision.

In the processing in S603, the result of calculating the color-case correction parameters is reflected in the calculation of correction parameters for brightness and contrast. In the processing of S604, the result of calculating the color-case correction parameters and the result of calculating correction parameters for brightness and contrast are reflected in the result of calculating saturation enhancement parameters.

The "face" of a person is an object having a color the hue of which has been determined to some extent, and a "desirable" state can be specified for the object. In the processing for calculating object optimization parameters (S203), it is necessary to execute a correction that is specialized in order to make the conversion to the "desirable" state.

Furthermore, "face" is an object to which the user is very sensitive as to whether its appearance is suitable or unsuitable, and an "overcorrection" tends to be undesirable. For example, if an image is other than a face, such as scenery, applying a correction that heightens contrast may improve appearance. In the case of a face, however, raising contrast too much can result in an image that gives a severe impression and this generally tends to be undesirable. Since there is such a tendency, the calculation of correction parameters is placed in a subordinate relationship as a technique for preventing an overcorrection at the processing (S203) for calculating correction parameters for an object area.

On the other hand, at the processing (S205) for calculating correction parameters for the overall image, the calculations of the correction parameters can be performed independently. Since it is difficult to determine the ideal state in relation to image quality at the processing (S205) for calculating correction parameters for the overall image, correction parameters corresponding to respective ones of the correction processes are calculated independently from an average value of the overall digital image.

Thus, at the processing (S203) for calculating correction parameters for an object area and processing (S205) for calculating correction parameters for the overall image, the methods of calculating the correction parameters differ. In the processing for calculating correction parameters for an object area, the calculation of color-cast correction parameters, the calculation of correction parameters for brightness and contrast and the calculation of saturation enhancement parameters are placed in a subordinate relationship. On the other hand, in the processing for calculating correction parameters for the overall image, the color-cast correction parameters, correction parameters for brightness and contrast and saturation enhancement parameters are calculated from the input image independently of one another.

{Conversion of Correction Parameters [S206 (S204)]}

Figure 7:
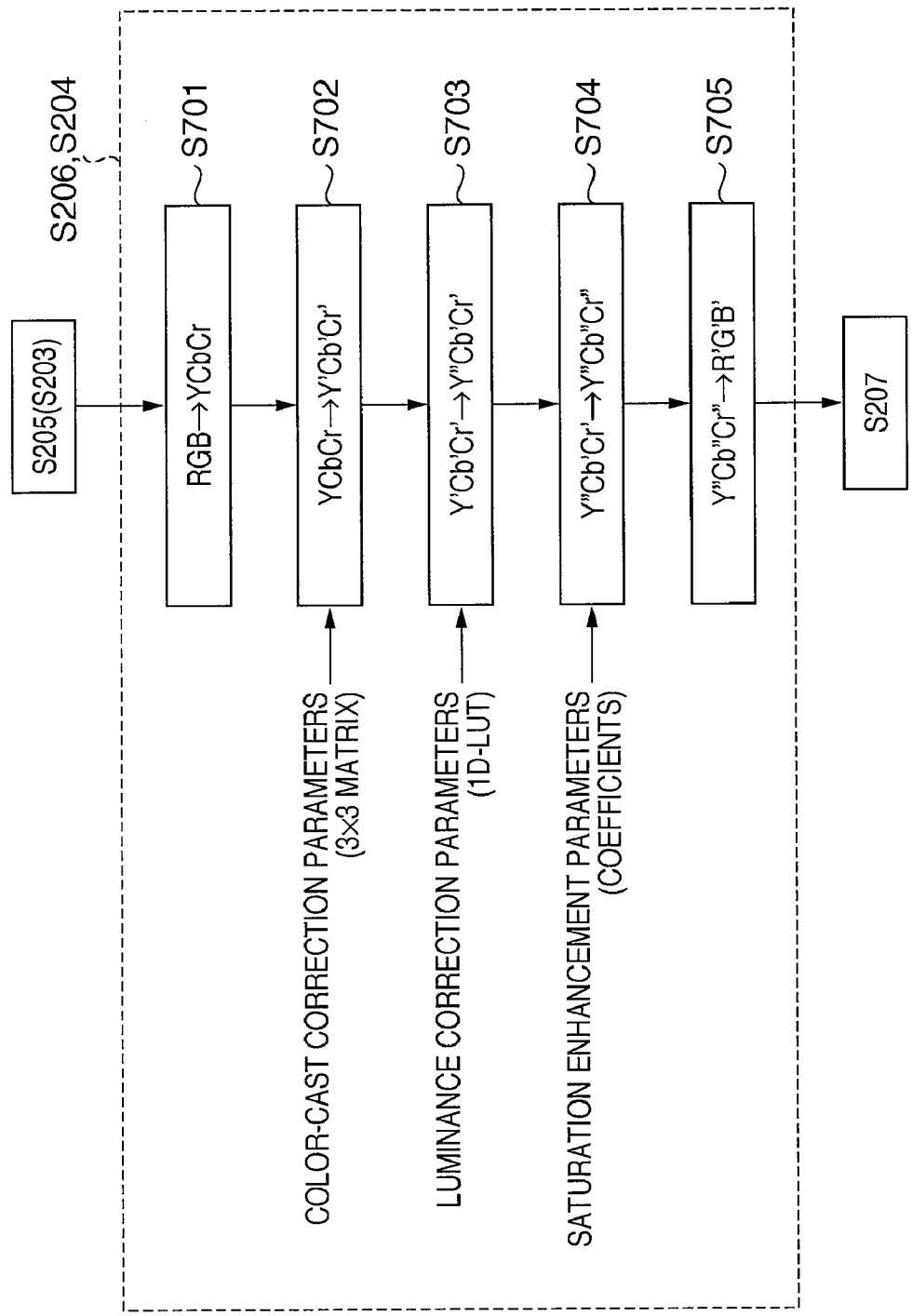
FIG. 7 is a flowchart useful in describing the flow of processing for converting correction parameters.

Next, the flow of processing for converting correction parameters will be described with reference to the flowchart of FIG. 7. In S206, image correction parameters corresponding to correction of an overall image are generated, these parameters reflecting correction parameters of the three types, namely color-cast correction parameters (3×3 matrix format), luminance correction parameters (1D-LUT) and saturation enhancement parameters (coefficients) with respect to color difference. This processing is executed under the control of the CPU 101. Further, in S204, image correction parameters corresponding to correction of an object area are generated, these parameters reflecting correction parameters of the three types, namely color-cast correction parameters (3×3 matrix format), luminance correction parameters (1D-LUT) and saturation enhancement parameters (coefficients) with respect to color difference. Since the processing of S206 basically is the same as the processing of S204, the processing of S206 will be described below.

First, in S701, the CPU 101 converts an RGB signal that has been input as a value of the original 3D-LUT to luminance Y, which is a component relating to image brightness, and to color difference signals Cb, Cr, which are components relating to color. In a case where a 3D-LUT of, for example, 4913 grids points is created, RGB values take on 4913 equally spaced values, namely (R,G,B)=(0,0,0), (0,0,16), (0,0,32) . . . (255,255,255). The CPU 101 performs the conversion, described below, with respect to these grids points.

Next, in S702, the CPU 101 performs a matrix computation in which the 3×3 rotation matrix calculated as the color-cast correction parameters is multiplied by Y, Cb, Cr obtained by the conversion, and calculates conversion values (Y',Cb',Cr'). Here Y' represents a first conversion value relating to luminance, and Cb', Cr' represent first conversion values relating to color-difference signal components.

Next, in S703, the CPU 101 refers to the data in the format of the one-dimensional look-up table (1D-LUT) that has been calculated as correction parameters for correcting luminance. The CPU 101 then calculates a second conversion value Y" obtained by correcting the first conversion value Y' relating to luminance calculated in S702 by referring to the 1D-LUT. At this time there is no change in the first conversion values Cb', Cr' relating to the color difference signals.

In S704, the CPU 101 refers to the saturation enhancement parameters and calculates second conversion values Cb", Cr" relating to color difference signals obtained by correcting the first conversion values Cb', Cr' relating to color difference signals calculated in S702. Here the saturation enhancement parameters may be the same coefficient for all halftones or may be changed over depending upon the value of luminance.

In S705, the CPU 101 converts Y"Cb"Cr", which have been calculated by the matrix computation mentioned above, to image correction parameters [R'(overall) G'(overall) B'(overall)] (second conversion parameters) corresponding to correction of the overall image. The computation set forth above is executed in relation to RGB data of 4913 grid points.

In the case of S204, Y"Cb"Cr" calculated based upon the correction parameters calculated in S203 are converted to image correction parameters [R'(local) G'(local) B'(local)] (first conversion parameters) corresponding to correction of the object area.

In relation to processing for conversion to image correction parameters corresponding to the correction of the object area (S204), it is unnecessary to execute conversion processing in relation to RGB data of all object areas extracted. In this case, by way of example, computation can be performed solely with regard to RGB values in the vicinity of a flesh-color area in order to express the face of a person, and RGB values representing colors different from the flesh color need not be converted. This makes it possible to execute efficiently.

[Blending of Parameters (S207)]

In S207, the CPU 101 generates image correction parameters obtained by blending the first conversion parameters

[R'(local) G'(local) B'(local)] and the second conversion parameters [R'(overall) G'(overall) B'(overall)] at a predetermined ratio.

The first and second conversion parameters have the format of a three-dimensional look-up table (3D-LUT) as the identical format. With regard to the blending (addition) of parameters, therefore, the CPU 101 is capable of executing computation according to the simple computational equations [(1) to (3)] set forth below. The CPU 101 performs the following computations with regard to each of the 4913 grid points.

$$R(blended)=(1-k) \times R'(overall)+k \times R'(local) \quad (1)$$

$$G(blended)=(1-k) \times G'(overall)+k \times G'(local) \quad (2)$$

$$B(blended)=(1-k) \times B'(overall)+k \times B'(local) \quad (3)$$

$k$=blending ratio

The CPU 101 is capable of determining the blending ratio k based upon object extraction information such as, for example, the sizes and number of extracted objects and degree of importance of extraction processing. Further, the CPU 101 is capable of deciding the blending ratio k by referring to shooting information that has been appended to the digital image, and the result of selection of the blending rate k by the user may be reflected. The CPU 101 is capable of deciding the blending ratio k so as to increase the ratio of image correction parameters corresponding to the object area based upon the fact that the extracted object occupies a large percentage of the overall digital image or depending upon information indicating the reliability of extraction processing, etc.

FIG. 8 is a diagram useful in describing processing for determining the blending ratio k in accordance with size of the partial image (the size of the face) extracted as the object. This is an example of a method of determining the blending ratio k. The horizontal axis of FIG. 8 is a plot of the ratio of the length of the short side of the partial image corresponding to the face of a person to the length of the short side of the overall digital image. It should be noted that the side is not limited to the short side, and it is possible to utilize data that is the result of normalizing the length of the long side. It is also possible to perform a comparison based upon the area of the partial image extracted as the object.

The vertical axis of FIG. 8 is a plot of the blending ratio k. In the example of FIG. 8, if the ratio of the length of the short side is 10%, then blending ratio=0.5 holds and the CPU 101 generates blended image correction parameters [R(blended) G(blended) B(blended)] according to Equations (4) to (6) below.

$$R(blended)=(1-0.5) \times R'(overall)+0.5 \times R'(local) \quad (4)$$

$$G(blended)=(1-0.5) \times G'(overall)+0.5 \times G'(local) \quad (5)$$

$$B(blended)=(1-0.5) \times B'(overall)+0.5 \times B'(local) \quad (6)$$

In this case, a contribution ratio applied to the image correction parameters obtained by blending the image correction parameters regarding the overall digital image and the image correction parameters regarding the object area is (1−0.5):0.5=0.5:0.5(=1:1).

In a case where the ratio of the length of the short side is 25%, blending ratio=1.0 holds. As the percentage of the overall image occupied by the partial image increases, the contribution ratio of the image correction parameters with respect to the object area increases.

In this embodiment, an example in which one object is extracted is described. However, images extracted from an overall digital image are not limited to a single image, and it is possible to extract a plurality of objects. The user can, via the user interface 105, select the type of object to be extracted. For example, in a case where a face and the sky have been selected as objects to be extracted, the CPU 101 is capable of calculating image correction parameters corresponding to the overall image, image correction parameters corresponding to the face and image correction parameters corresponding to the sky. In this case, the image correction parameters corresponding to the sky would be parameters in which corrections of hue, brightness and saturation that are capable of expressing the desired "sky color" have been reflected. By introducing two blending ratios k1 and k2, the CPU 101 can blend the three image correction parameters at a prescribed ratio [Equations (7) to (9)]. As a result, image correction parameters for reflecting correction processing suited to the overall digital image, face and sky can be obtained.

$$R''(blended)=(1-k1-k2) \times R'(overall)+k1 \times R'[local(face)]+k2 \times R'[local(sky)] \quad (7)$$

$$G''(blended)=(1-k1-k2) \times G'(overall)+k1 \times G'[local(face)]+k2 \times G'[local(sky)] \quad (8)$$

$$B''(blended)=(1-k1-k2) \times B'(overall)+k1 \times B'[local(face)]+k2 \times B'[local(sky)] \quad (9)$$

In Equations (7) to (9), the CPU 101 is capable of determining the blending ratios k1, k2 based upon object extraction information such as, for example, the sizes and number of extracted objects, degree of importance of extraction processing and reliability of extraction processing in a manner similar to the operation described above with reference to Equations (1) to (3). Further, the CPU 101 is capable of deciding the blending ratios k1, k2 by referring to shooting information that has been appended to the digital image, and the result of selection of the blending rate k by the user may be reflected.

In accordance with this embodiment, correction processing suited to both an overall image and object can be executed without a rise in cost.

Other Embodiments

It goes without saying that the object of the present invention is attained also by supplying a computer-readable storage medium storing a computer program for performing the functions of the foregoing embodiment to a system or an apparatus. Further, it goes without saying that the object of the present invention is attained also by having a computer (or a CPU or MPU) of a system or apparatus read and execute a computer program that has been stored on a storage medium.

In this case, the computer program per se read from the storage medium implements the functions of the foregoing embodiment and the storage medium storing the computer program constitutes the present invention.

Examples of storage media that can be used for supplying the computer program are a flexible disk, hard disk, optical disk, magneto-optical disk, CD-ROM, CD-R, non-volatile memory card or ROM, etc.

Further, the functions of the foregoing embodiment are implemented by executing a computer program read out by computer.

Further, it goes without saying that the present invention also covers a case where an operating system or the like running on the computer performs some or all of the actual processing based upon the instructions of the computer program so that the foregoing embodiment is implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-199903, filed Jul. 31, 2007, which is hereby incorporated by reference herein in its entirety.

What is claimed is:

1. An image processing apparatus comprising:
   an extracting means for extracting a partial image corresponding to an object from an entered image;
   first calculating means for calculating a plurality of types of correction parameters with regard to respective ones of a plurality of types of correction processes to be executed based on image information of the partial image;
   first generating means for generating first conversion parameters reflecting respective ones of the plurality of types of correction parameters calculated by said first calculating means;
   second calculating means for calculating, using a calculation method different from a calculation method of said first calculating means, a plurality of types of correction parameters with regard to respective ones of a plurality of types of correction processes to be executed based on image information of the entered image;
   a second generating means for generating second conversion parameters having a format common with that of the first conversion parameters, the second correction parameters reflecting respective ones of the plurality of types of correction parameters calculated by said second calculating means; and
   image correction parameter generating means for adding the first conversion parameters and the second conversion parameters in accordance with a predetermined ratio, thereby generating image correction parameters for correcting the entered image.

2. The apparatus according to claim 1, wherein the plurality of types of correction parameters calculated by said first calculating means and said second calculating means are parameters to be used for correcting at least one of color cast, luminance, and saturation.

3. The apparatus according to claim 2, wherein said first calculating means:
   calculates correction parameters for performing the correction of luminance based upon result of calculating correction parameters for performing the correction of color cast and a luminance target value predetermined with regard to the partial image; and
   calculates correction parameters for performing the correction of saturation based upon the result of calculating correction parameters for performing the correction of color cast, result of calculating the correction parameters for performing the correction of luminance and target values of color difference components predetermined with regard to the partial image.

4. The apparatus according to claim 2, wherein the correction parameters for performing the correction of color cast, correction parameters for performing the correction of luminance and correction parameters for performing the correction of saturation are any of data in a 3×3 matrix format, data in a format of a one-dimensional look-up table and data in a coefficient format.

5. The apparatus according to claim 3, wherein said first generating means generates the first conversion parameters in the format of a three-dimensional look-up table that reflects a plurality of parameters that are any of the correction parameters for performing the correction of color cast, the correction parameters for performing the correction of luminance and the correction parameters for performing the correction of saturation.

6. The apparatus according to claim 2, wherein said second generating means generates the second conversion parameters in the format of a three-dimensional look-up table that reflects a plurality of parameters that are any of the correction parameters for performing the correction of color cast, the correction parameters for performing the correction of luminance and the correction parameters for performing the correction of saturation.

7. The apparatus according to claim 1, wherein said second calculating unit means calculates, from the entered image, each of correction parameters for performing a correction of color cast, correction parameters for performing a correction of luminance and correction parameters for performing a correction of saturation independently.

8. An image processing method comprising:
   an extracting step of extracting a partial image corresponding to an object from an entered image;
   a first calculating step of a plurality of types of calculating correction parameters with regard to respective ones of a plurality of types of correction processes to be executed based on image information of the partial image;
   a first generating step of generating first conversion parameters reflecting respective ones of the plurality of types of correction parameters calculated at said first calculating step;
   a second calculating step of calculating, using a calculation method different from a calculation method of said first calculating step, a plurality of types of correction parameters with regard to respective ones of a plurality of types of correction processes to be executed based on image information of the entered image;
   a second generating step of generating second conversion parameters having a format common with that of the first conversion parameters, the second correction parameters reflecting respective ones of the plurality of types of correction parameters calculated at said second calculating step; and
   an image correction parameter generating step of adding the first conversion parameters and the second conversion parameters in accordance with a predetermined ratio, thereby generating image correction parameters for correcting the entered image.

9. The method according to claim 8, wherein the plurality of types of correction parameters calculated in said first calculating step and said second calculating step are parameters to be used for correcting at least one of color cast, luminance and saturation.

10. The method according to claim 9, wherein said first calculating step includes:
    calculating correction parameters for performing the correction of luminance based upon result of calculating correction parameters for performing the correction of color cast and a luminance target value predetermined with regard to the partial image; and
    calculating correction parameters for performing the correction of saturation based upon the result of calculating correction parameters for performing the correction of color cast, result of calculating the correction parameters for performing the correction of luminance and target values of color difference components predetermined with regard to the partial image.

11. The method according to claim 9, wherein the correction parameters for performing the correction of color cast, correction parameters for performing the correction of luminance and correction parameters for performing the correction of saturation are any of data in a 3×3 matrix format, data in a format of a one-dimensional look-up table and data in a coefficient format.

12. The method according to claim 10, wherein said first generating step includes generating the first conversion parameters in the format of a three-dimensional look-up table that reflects a plurality of parameters that are any of the correction parameters for performing the correction of color cast, the correction parameters for performing the correction of luminance and the correction parameters for performing the correction of saturation.

13. The method according to claim 9, wherein said second generating step includes generating the second conversion parameters in the format of a three-dimensional look-up table that reflects a plurality of parameters that are any of the correction parameters for performing the correction of color cast, the correction parameters for performing the correction of luminance and the correction parameters for performing the correction of saturation.

14. The method according to claim 8, wherein said second calculating step includes calculating, from the entered image each of correction parameters for performing a correction of color cast, correction parameters for performing a correction of luminance and correction parameters for performing a correction of saturation independently.

15. A non-transitory computer-readable storage medium storing a computer program which causes a computer to execute an image processing method set forth in claim 8.

* * * * *